United States Patent [19]
Kobayashi

[11] Patent Number: 5,133,695
[45] Date of Patent: Jul. 28, 1992

[54] BICYCLE MULTIPLE CHAINWHEEL

[75] Inventor: Jun Kobayashi, Osaka, Japan

[73] Assignee: Maeda Industries, Ltd., Osaka, Japan

[21] Appl. No.: 499,544

[22] PCT Filed: Feb. 13, 1990

[86] PCT No.: PCT/JP90/00176
§ 371 Date: Jul. 2, 1990
§ 102(e) Date: Jul. 2, 1990

[87] PCT Pub. No.: WO90/09308
PCT Pub. Date: Aug. 23, 1990

[30] Foreign Application Priority Data

Feb. 15, 1989 [JP] Japan ................. 1-16689[U]
Apr. 27, 1989 [JP] Japan ................. 1-50472[U]

[51] Int. Cl.$^5$ ............................... F16H 55/30
[52] U.S. Cl. ......................... 474/160; 74/457;
74/594.2; 474/164
[58] Field of Search ............. 474/160, 164, 78, 152,
474/162; 74/594.2, 457

[56] References Cited

U.S. PATENT DOCUMENTS

| | | | |
|---|---|---|---|
| 4,181,033 | 1/1980 | Nagano | 474/160 X |
| 4,259,880 | 4/1981 | Ueno | 74/594.2 |
| 4,348,200 | 9/1982 | Terada | 474/160 |
| 4,519,791 | 5/1985 | Nagano | 474/152 |
| 4,521,207 | 6/1985 | Huoted | 474/164 X |
| 4,522,611 | 6/1985 | Hiatt | 474/162 |
| 4,773,893 | 9/1988 | Su et al. | 474/160 X |
| 4,813,916 | 3/1989 | Valin | 474/152 |
| 4,889,521 | 12/1989 | Nagano | 474/164 |

FOREIGN PATENT DOCUMENTS

| | | | |
|---|---|---|---|
| 56-3265 | 1/1981 | Japan . | |
| 64-37793 | 3/1989 | Japan . | |
| 64-40790 | 3/1989 | Japan . | |
| 64-40791 | 3/1989 | Japan . | |
| 595565 | 2/1978 | U.S.S.R. | 474/152 |

Primary Examiner—Hoang C. Dang
Attorney, Agent, or Firm—Marks Murase & White

[57] ABSTRACT

A bicycle multiple chainwheel is provided which is mounted on a pedal crank for transmitting a rider's pedalling force to a rear gear through a chain. The chainwheel has the following configuration to prevent a chain from being locked to a diametrically larger sprocket or from prematurely disengaging from the larger sprocket before completely shifting to a diametrically smaller sprocket.

The larger sprocket has circumferentially asymmetric teeth located in at least one of diametrically opposite angular regions which contain a diametrical line of the larger sprocket extending along crank arms of the pedal crank, each of the asymmetric teeth being offset relative to a corresponding pitch center in the forward rotational direction of the chainwheel in comparison with the other normal teeth of the larger sprocket.

10 Claims, 8 Drawing Sheets

BICYCLE MULTIPLE CHAINWHEEL

FIELD OF THE INVENTION

This invention relates to a bicycle multiple chainwheel having at least two diametrically different sprockets. More specifically, the invention relates to a multiple chainwheel which is designed to provide smooth chain shifting from a larger sprocket to a smaller sprocket.

BACKGROUND ART

Many of currently available bicycles not only have a multiple freewheel to constitute a rear gear mounted on a rear wheel hub, but also incorporate a multiple chainwheel to constitute a front gear (front gear being usually called "chainwheel") mounted on a pedal crank, thereby increasing the number of selectable speeds. When, for example, a freewheel having five sprockets is combined with a chainwheel having three sprockets, it is possible to select fifteen speeds.

In a multiple chainwheel, a diametrically largest sprocket is located at the right as viewed in the bicycle running direction, and progessively smaller sprockets are arranged toward the left. A maximum speed is obtainable when the chain is in engagement with the largest sprocket.

With such a chainwheel, a speed change is performed by causing a front deraileur to laterally press a portion of the chain entering to the chainwheel in rotation, with the result that the chain is shifted from a smaller sprocket to a larger sprocket or vice versa. Obviously, the speed change performance of the chainwheel is determined by the smoothness and promptness in disengaging the chain from a presently engaging sprocket for engagement with a target sprocket.

However, a problem called "chain locking phenomenon" arises in shifting the chain from a larger sprocket to a smaller sprocket. This phenomenon is now described with reference to FIGS. 9 through 13.

FIGS. 9, 10, 11 and 13 are views, as seen from the left side of the bicycle, showing the successive stages of shifting a chain C from a larger sprocket 1 to smaller sprocket 2 of a chainwheel CW to illustrate the problem. FIG. 12 is a view as seen in the direction of an arrow XII in FIG. 11.

In FIGS. 9, 10, 11 and 13, the larger sprocket 1 is located farther from the viewer. The chain C comprises pairs of inner link plated Pa1, Pa2, and pairs of outer link plates Pb1, Pb2 which are alternate with the pairs of inner link plates and connected thereto by means of roller pins R. The chain C is engageable with each sprocket in a manner such that each tooth of the sprocket is inserted between a corresponding pair of inner link plates Pa1, Pa2 or outer link plates Pb1, Pb2 with the roller pins R received between the sprocket teeth.

In shifting the chain C in engagement with the larger sprocket 1 to the smaller sprocket 2, a portion of the chain C moving into engagement with the larger sprocket 1 is pressed toward the smaller sprocket 2 by an unillustrated front deraileur, thereby causing the chain C to disengage from the larger sprocket 1. The chain C is subjected to a tension applied by a tension spring incorporated in an unillustrated rear deraileur. Therefore, the chain C having disengaged from a tooth ta of the larger sprocket 1 starts shifting to the smaller sprocket 2 in a manner such that the chain C extends tangentially to the smaller sprocket from the roller pin RO (disengagement starting roller pin) immediately following the pair of link plates which have disengaged from the larger sprocket tooth ta, as shown in FIG. 10.

Now, a tangential line 1 for the smaller sprocket 2 is drawn from a teeth interval center 01 of the larger sprocket 1 located at the disengagement starting roller pin RO to a teeth interval center 02 of the smaller sprocket 2. When the length of the tangential line 1 is larger than an integral multiple (n) of the chain pitch (p) by a fragmentary amount x (i.e., the distance between the teeth interval centers 01 and 02 being np +x), the chain locking phenomenon occurs upon application, to the chainwheel CW, of a large rotational force.

Normally, at the time of chain shifting, the chainwheel rotates for a while with laterally displaced roller pins R (following the disengagement starting roller pin RO) of the chain partially engaging teeth tips of the smaller sprocket 2. The chain can come into full engagement with the smaller sprocket 2 only when the laterally displaced roller pins R correspond in position to the teeth intervals of the smaller sprocket. However, if a large rotational force is applied to the chainwheel CW held in the condition of FIG. 10, the chain C is subjected to a large tension. As a result, the laterally displaced roller pins R are forcibly brought into full engagement with the teeth intervals of the smaller sprocket 2, and the disengagement starting roller pin RO corresponding to the above-mentioned teeth interval center 01 of the larger sprocket 1 is forcibly displaced radially inward along a side surface of the larger sprocket 1, as shown in FIG. 11.

As shown in FIG. 12, the inner link plate Pa1 having cleared a tooth ta of the larger sprocket together with the outer link plate Pb1 immediately preceding that particular inner link plate extends obliquely across the interval between the tooth ta and the immediately preceding tooth tb while these link plates are forcibly moved radially inward. The sprocket teeth are rendered thicker toward the teeth roots. Thus, the inner link plate Pa1 and the outer link plate Pb1, when moved radially inward as above, firmly engage with the corresponding teeth ta, tb, so that the chain C is locked to the larger sprocket 1. Further, the inner link plate Pa1 and the outer link plate Pb1 are laterally pressed by the teeth ta, tb, so that the chain is subjected to a bending force in the direction of arrows A in FIG. 12. By the influences of such a bending force, left-hand link plates of the chain C are laterally pressed against the teeth tc, td, te preceding the above-mentioned tooth tb on the side closer to the smaller sprocket, consequently assisting the chain C to be locked to the larger sprocket 1.

Once the chain locking phenomenon occurs, it is no longer possible for the chain C to disengage from the larger sprocket 1. Therefore, the chainwheel CW rotates with the chain C locked to the larger sprocket 1, as shown in FIG. 13. When the chainwheel CW continues to rotate further in this condition, the chain C locked to the larger sprocket 1 comes into damaging impingement with the front deraileur. Further, in case the larger sprocket 1 is made of a light metal, the teeth thereof may be deformed.

The chain locking phenomenon is more likely to occur when each sprocket tooth is made to have a larger width, as shown in FIG. 8. This is because each teeth interval becomes smaller as the tooth width is larger. The reduced teeth interval results in that the link plates of the chain C engage more firmly with the relevant teeth ta, tb, as shown in FIG. 12. Further, the bending force applied to the chain becomes also larger.

Conventionally, therefore, attempts have been often made to slenerize each sprocket tooth by rendering the tooth width to decrease sharply toward the tooth tip, as shown in FIG. 7. Compared with the sprocket of FIG. 8 having larger width teeth, the sprocket having slenderized teeth facilitates chain disengagement and readily allows laterally oblique chain extension, thereby reducing the chance of the chain locking phenomenon.

The conventional countermeasure seems to improve the performance in shifting the chain from the larger sprocket to the smaller sprocket. In reality, however, the conventional measure excessively facilitates chain disengagement. Therefore, a new problem arises that the chain may prematurely disengage from the larger sprocket before completely shifting to the smaller sprocket, whereby the chain falls in between the larger and smaller sprockets. Such premature chain disengagement may be prevented by increasing the width of the sprocket teeth, as shown in FIG. 8. However, this measure in turn leads to increased occurrence of the chain locking phenomenon, as already described.

DISCLOSURE OF THE INVENTION

It is, therefore, an object of the present invention is to provide a bicycle multiple chainwheel which is capable of simultaneously satisfying two contradictory requirements of preventing the chain locking phenomenon and the premature chain disengaging phenomenon, thereby facilitating chain shifting from a larger sprocket to a smaller sprocket.

Another object of the present invention is to provide a bicycle multiple chainwheel which facilitates chain shifting from a larger sprocket to a smaller sprocket while preventing deterioration in performance of shifting the chain from the smaller sprocket to the larger sprocket.

According to the present invention, there is provided a bicycle multiple chainwheel which is mounted on a pedal crank for transmitting a rider's pedalling force to a rear gear through a chain, the chainwheel comprising:

a diametrically larger sprocket mounted to the pedal crank and having an axis coinciding with the cranking axis of the pedal crank; and at least one diametrically smaller sprocket arranged laterally of but coaxially with the larger sprocket and mounted to the larger sprocket or the pedal crank; wherein the larger sprocket has asymmetric teeth located in at least one angular region which contains a diametrical line of the larger sprocket extending along crank arms of the pedal crank, each of the asymmetric teeth being offset relative to a corresponding pitch center in a forward rotational direction of the larger sprocket.

Other objects, features and advantages of the present invention will be clearly understood from the following description of the preferred embodiments given with reference to the accompanying drawings.

BRIEF DESCRIPTION OF THE DRAWINGS

FIGS. 9, 10, 11 and 13 being side views of the chainwheel as seen from the side of the smaller sprocket; FIG. 12 being a view of the chainwheel as seen in the arrow XII direction in FIG. 11.

BEST MODE OF CARRYING OUT THE INVENTION

Figure 2:
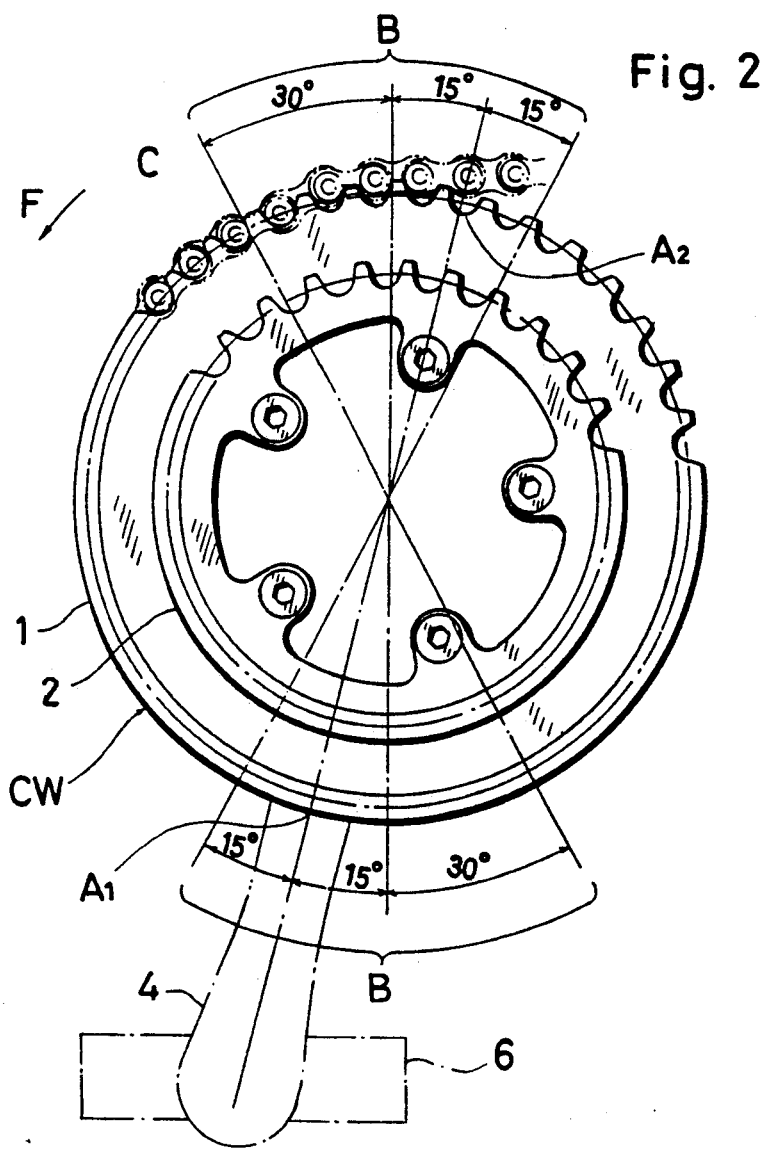
FIG. 2 is a schematic side view showing a chainwheel according to the embodiment as seen from the side of the diametrically smaller sprocket.
Figure 3:
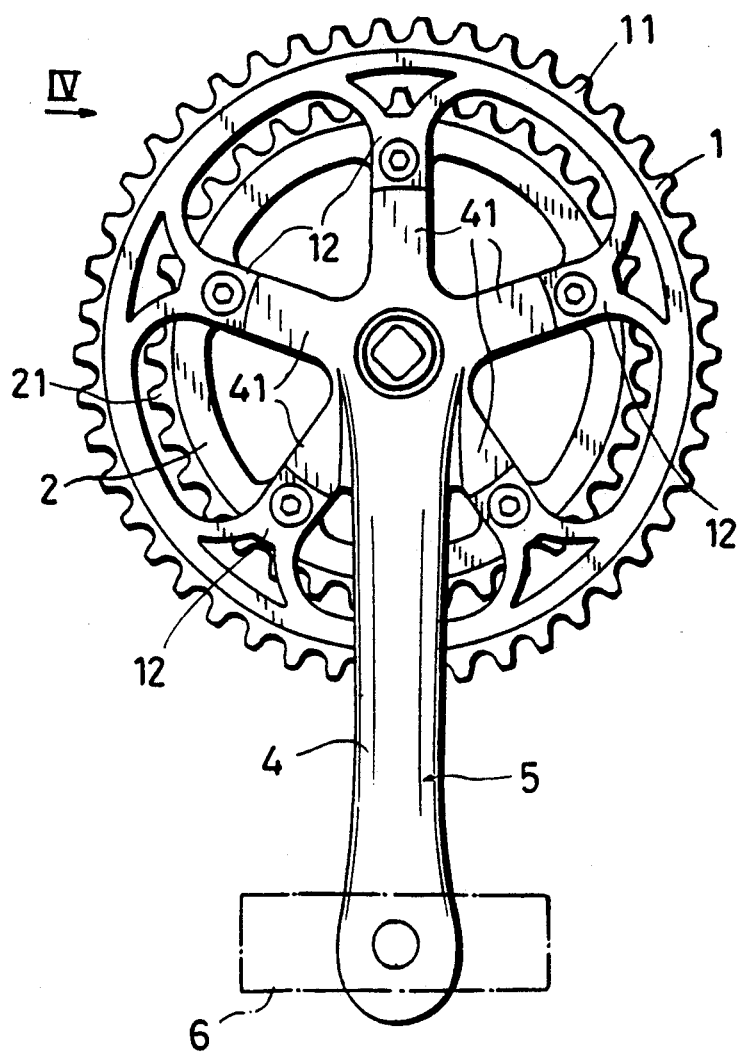
FIG. 3 is a side view of the same chainwheel as seen from the side of the larger sprocket.
Figure 4:
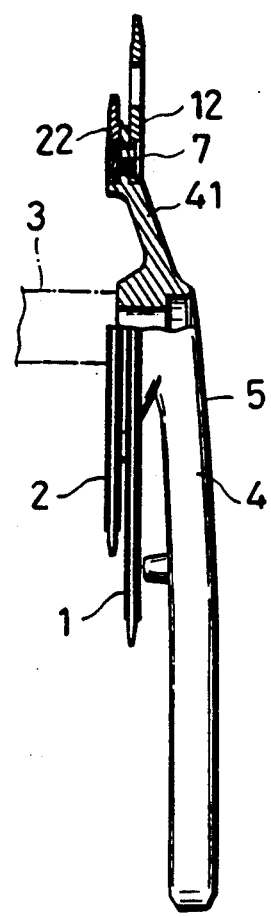
FIG. 4 is a view of the same chainwheel as seen in the direction of an arrow IV in FIG. 3.

As shown in FIGS. 2 through 4, a multiple chainwheel CW comprises a diametrically larger sprocket 1, and a diametrically smaller sprocket 2 arranged laterally inwardly of the larger sprocket. Thus, the chainwheel of the illustrated embodiment has two sprockets in total. However, the chainwheel may also includes an additional smaller sprocket or sprockets (not shown) to have three or four sprockets in total.

The multiple chainwheel CW is mounted on a pedal crank 5 which comprises a crank shaft 3, and crank arms 4 connected respectively to both ends of the crank shaft. The chainwheel rotates with the crank shaft 3 when the rider applies a driving force by means of pedals 6. The crank shaft 3 is rotatably supported by the bottom bracket lug of an unillustrated bicycle frame.

The larger sprocket 1 has a tooth carrying ring portion 11 which is formed with teeth along its outer circumference, and five stays 12 which are equiangularly spaced and extend radially inward from the tooth carrying ring portion. One crank arm 4 has a base portion which is integrally formed with five support arms 41 extending radially outward for connection at their respective outer ends to the stays 12 by means of bolts 7. Similarly to the larger sprocket 1, the smaller sprocket 2 has a tooth carrying ring portion 21, and five stays 22. The above-mentioned bolts 7 are commonly used for connecting the stays 22 to the support arms 41 together with the stays 12 of the larger sprocket 1.

According to the present invention, selected teeth of the larger sprocket 1 are improved in shape for improving the performance in shifting the chain C from the larger sprocket 1 to the smaller sprocket 2.

Tooth shape improvement may be made with respect to those teeth of the larger sprocket 1 located in at least one of two diametrically opposite angular regions containing circumferential points (indicated by reference signs A1, A2 in FIG. 2) which are positioned on a diametrical line extending along the crank arms 4. According to the illustrated embodiment, the tooth shape improvement is made with respect to both of the two angular regions containing the diametrically opposite circumferential points A1, A2.

According to the present invention, the shape-improved teeth are rendered circumferentially asymmetric in a manner such that the asymmetric teeth are offset relative to their respective pitch centers (indicated by chain lines C in FIG. 1) in the forward rotational direction (arrow F direction in FIGS. 1 and 2) of the chainwheel CW, as opposed to the other normal teeth of the larger sprocket.

Figure 1:
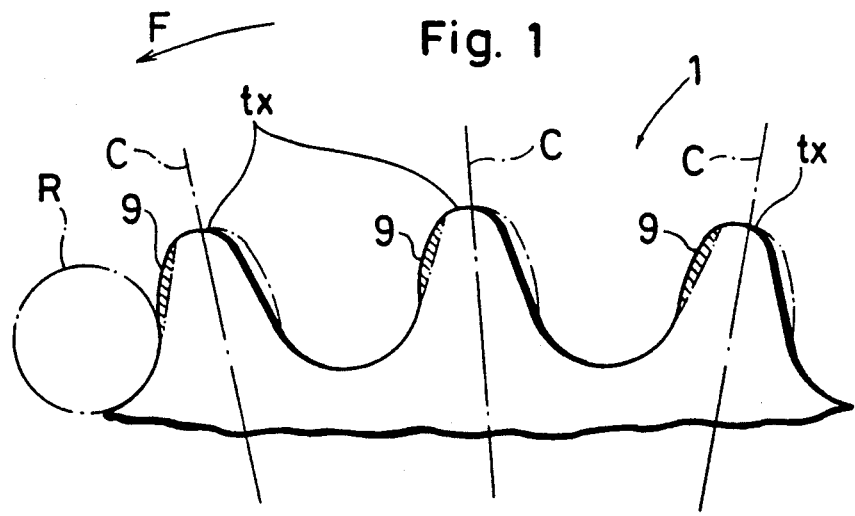
FIG. 1 is a side view showing a toothed portion of the diametrically larger sprocket embodying the present invention.

According to the illustrated embodiment, each of the asymmetric teeth tx has a leading edge 9 which, in comparison with the other normal teeth, is rendered forwardly convex for a portion thereof extending from an intermediate height to the tooth tip, as shown in FIG. 1. Alternatively, the leading edge 9 of each asymmetric tooth may be forwardly bulged only at a tooth tip portion or intermediate portion. Further, each asymmetric tooth may alternatively or additionally have a trailing edge whose spacing from the corresponding pitch center is smaller than the spacing between the trailing edges of the other normal teeth and their respective pitch centers.

As described above, the angular regions containing the circumferential points A1, A2, of the larger sprocket 1 are selected as portions for performing the tooth shape improvement. The reason for such selection is as follows.

In shifting the chain C from one sprocket to another of the multiple chainwheel CW, a portion of the chain C moving toward the chainwheel CW is laterally pressed by an unillustrated front derailleur. As a result, the chain C is partially inclined in plan view to cause disengagement from the previous sprocket for engagement with the target sprocket.

Figure 5:
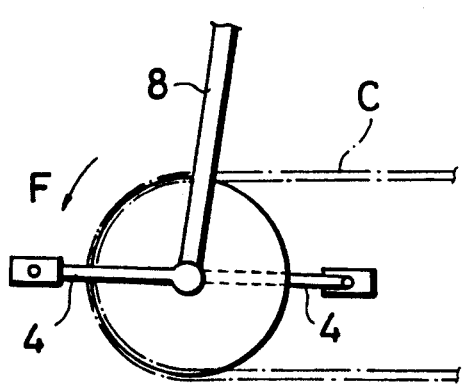
FIG. 5 is a view for illustrating the timing of chain shifting relative to the chainwheel, this view showing the condition wherein the chain is subjected to a maximum tension.
Figure 6:
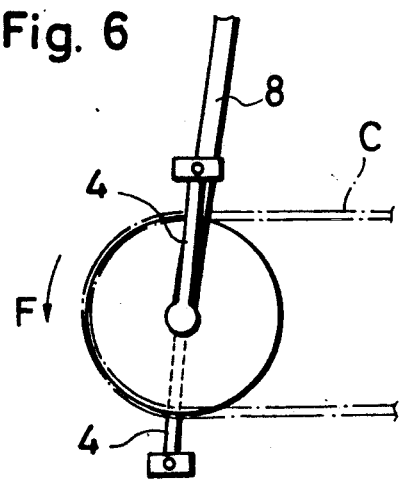
FIG. 6 is also a view for illustrating the timing of chain shifting relative to the chainwheel, this view showing the condition wherein the chain is held under a minimum tension.

The portion (forward path) of the chain C moving toward the chainwheel CW is subjected to a larger tension because this chain portion must transmit a driving force to the rear gear. While such a large tension is applied to the chain C, lateral pressing of the chain by the front derailleur will not easily cause the chain to disengage the chain from any sprocket. However, the forward path of the chain C is not always subjected to a larger tension. In fact, the chain tension varies depending on the rotational position of the crank arms 4. Specifically, as shown in FIG. 5, when the crank arms 4 are substantially horizontal, the rider's driving force exerted on the pedals 6 is most effectively transmitted to the chainwheel CW as a rotational moment to make the chain tension maximum. On the other hand, as shown in FIG. 6, when the crank arms 4 are generally at their respective upper and lower dead points, the chain tension becomes minimum because the pedalling force of the rider is poorly transmitted to the chainwheel CW.

Thus, even if the front derailleur is continuously caused to laterally press the chain C, the actual disengagement of the chain C from the sprocket takes place generally at the time when the chain tension reduces to minimum. In other words, the chain C is most likely to disengage from the sprocket when the crank arms 4 assume the respective upper and lower dead points shown in FIG. 6.

The chainwheel as the front gear and the freewheel as the rear gear are horizontally spaced from each other in the lengthwise direction of the bicycle, so that the forward path of the chain enters to and comes into engagement with the rotating chainwheel at a top portion thereof. Thus, when the crank arms 4 assume their respective dead points, the chain C starts engaging with the chainwheel CW at one of the above-mentioned angular regions containing the diametrical points A1, A2 at which the chain intersects a longitudinal axis of the crank arms 4.

In other words, the angular regions containing the circumferential points A1, A2 of the larger sprocket 1 provide positions where the chain C is most likely to disengage from that sprocket. Thus, by making improvement with respect to those teeth contained in these regions, it may be possible to enhance the performance in shifting the larger sprocket 1 to the smaller sprocket 2.

It should be appreciated that, in general, the seat tube (saddle support tube which is a member represented by reference numeral 8 in FIGS. 5 and 6) of the bicycle frame is inclined slightly rearward, and the actual dead points of the crank arms 4 are substantially located on the longitudinal axis of the seat tube 8. Therefore, the dead points of the crank arms are displaced from the vertical by about 5°–15° in the rearward rotational direction of the chainwheel CW. In this case, on the other hand, the larger sprocket 1 starts engaging with the chain C at a circumferential position thereof deviating in the forward rotatinal direction of the chainwheel CW by a specific angle (about 5°–15° as above) from the circumferential position A1 (or A2). In reality, the chain is likely to disengage from the larger sprocket within the angular regions (regions B designated in FIG. 2) each of which covers an angle of 30° forward and rearward from a diametrical line which is displaced through the above-mentioned specific angle in the forward rotational direction of the chainwheel from the above-mentioned circumferential points A1, A2. Thus, the asymmetric teeth tx should be preferably provided in these angular regions.

The bicycle multiple chainwheel having the above arrangement operates in the following manner.

While the bicycle is running, the chainwheel CW is rotated in the arrow F direction, as shown in FIGS. 1 and 2. In shifting the chain C from the larger sprocket 1 to the smaller sprocket 2, the front deraileur (not shown) is caused to laterally press the chain C at a position thereof moving into engagement with the larger sprocket 1. As a result, the chain C starts disengaging from the larger sprocket in one of the angular regions containing the diametrical line extending along the longitudinal axis of the crank arms 4 (namely containing the circumferential points A1, A2 shown in FIG. 2), as already described. As shown in FIG. 1, each roller pin R of the chain C comes into contact with the leading edge of a corresponding sprocket tooth during rotation of the chainwheel CW, and rolls up the leading edge to the tooth tip at the time of disengaging from that tooth.

Figure 7:
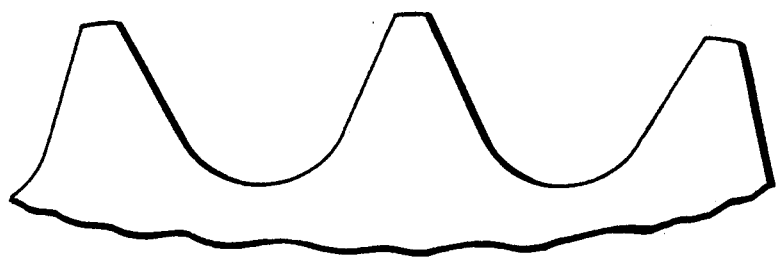
FIGS. 7 and 8 are side views each showing a toothed portion of a conventional larger sprocket.
Figure 8:
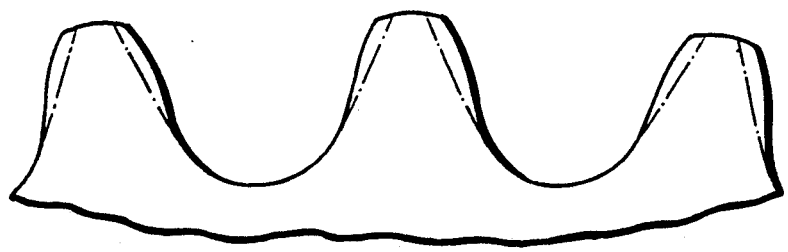
Figure 9:
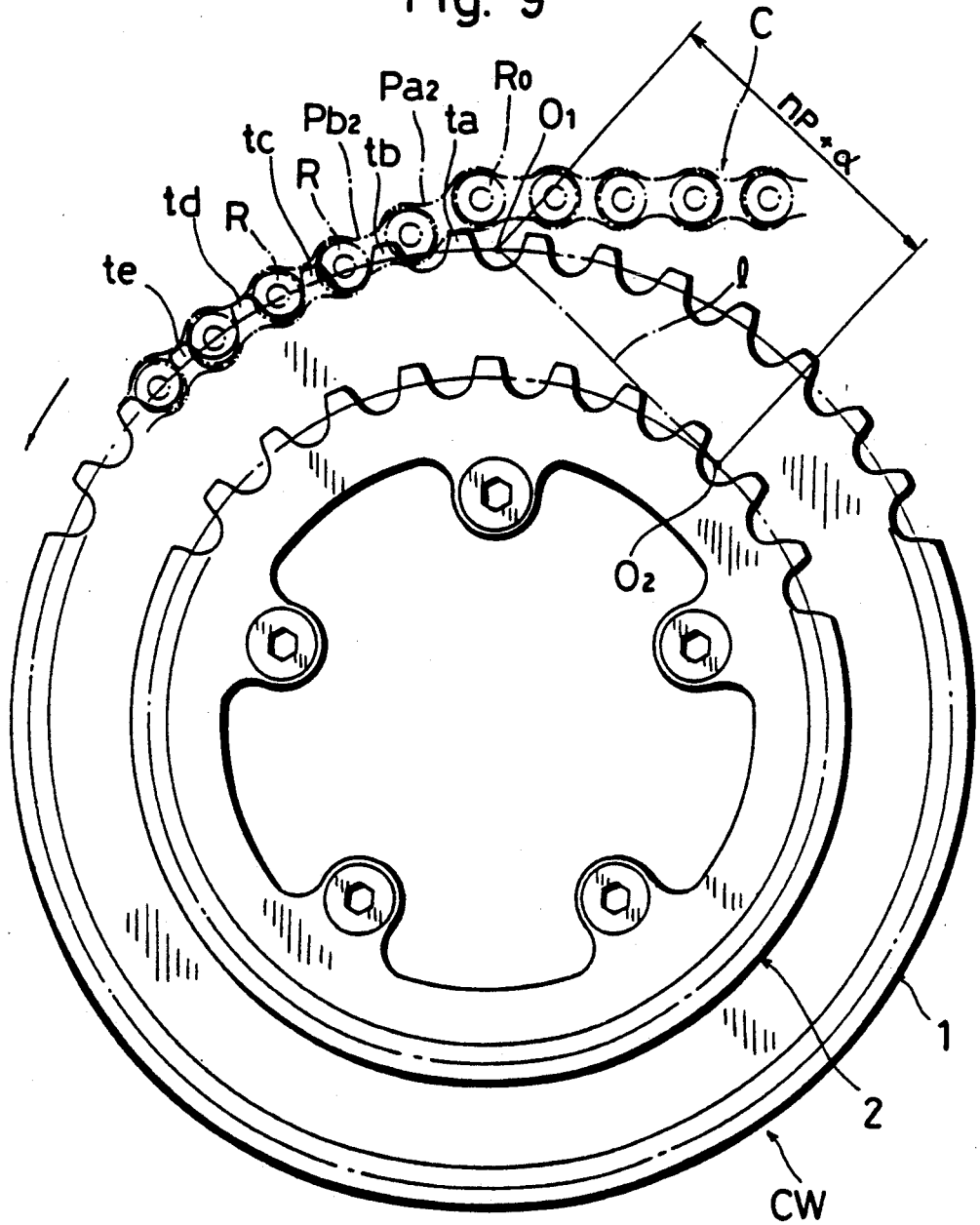
FIGS. 9 through 13 are views showing the manner of chain shifting with respect to a prior art chainwheel.
Figure 10:
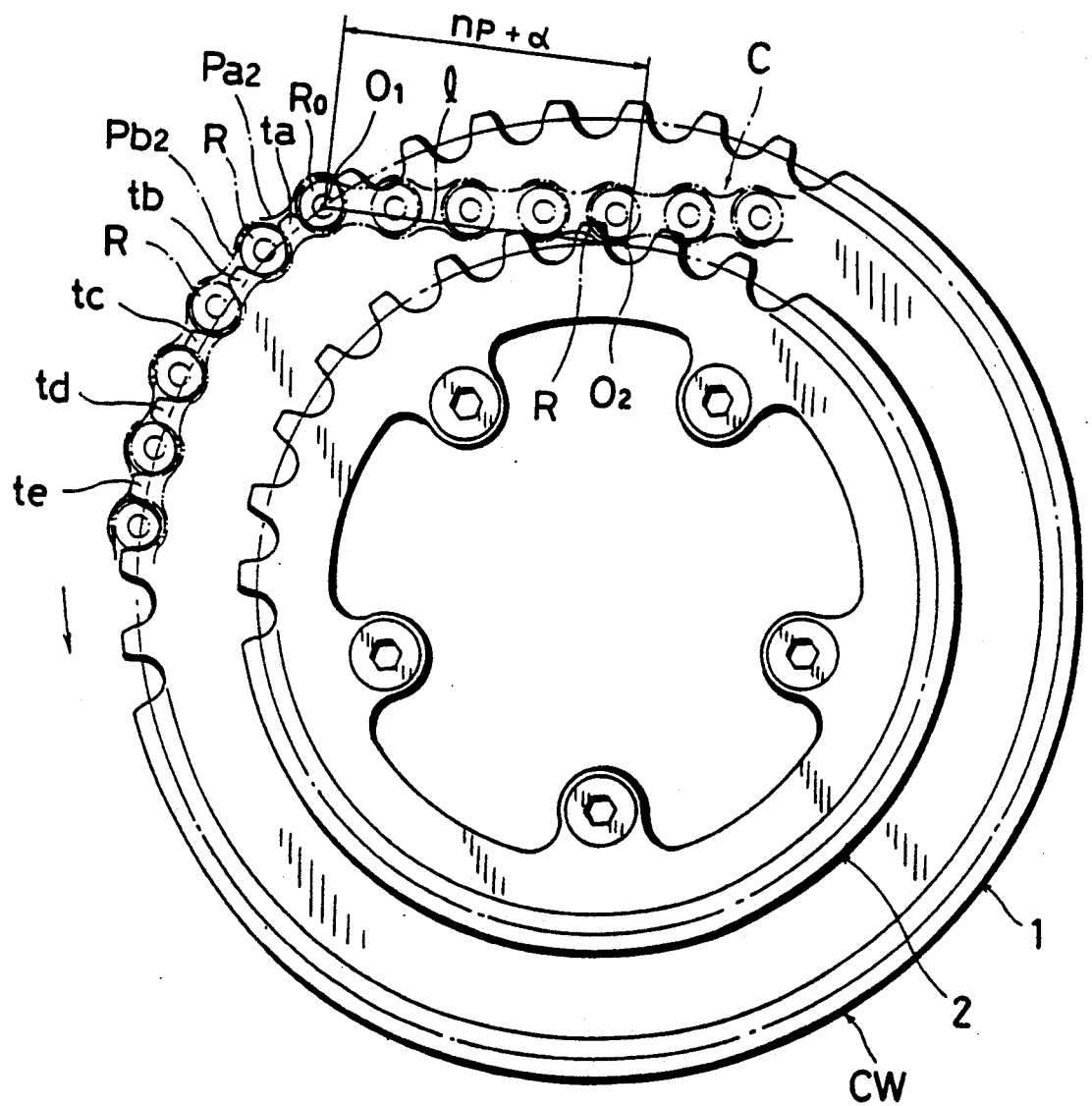
Figure 11:
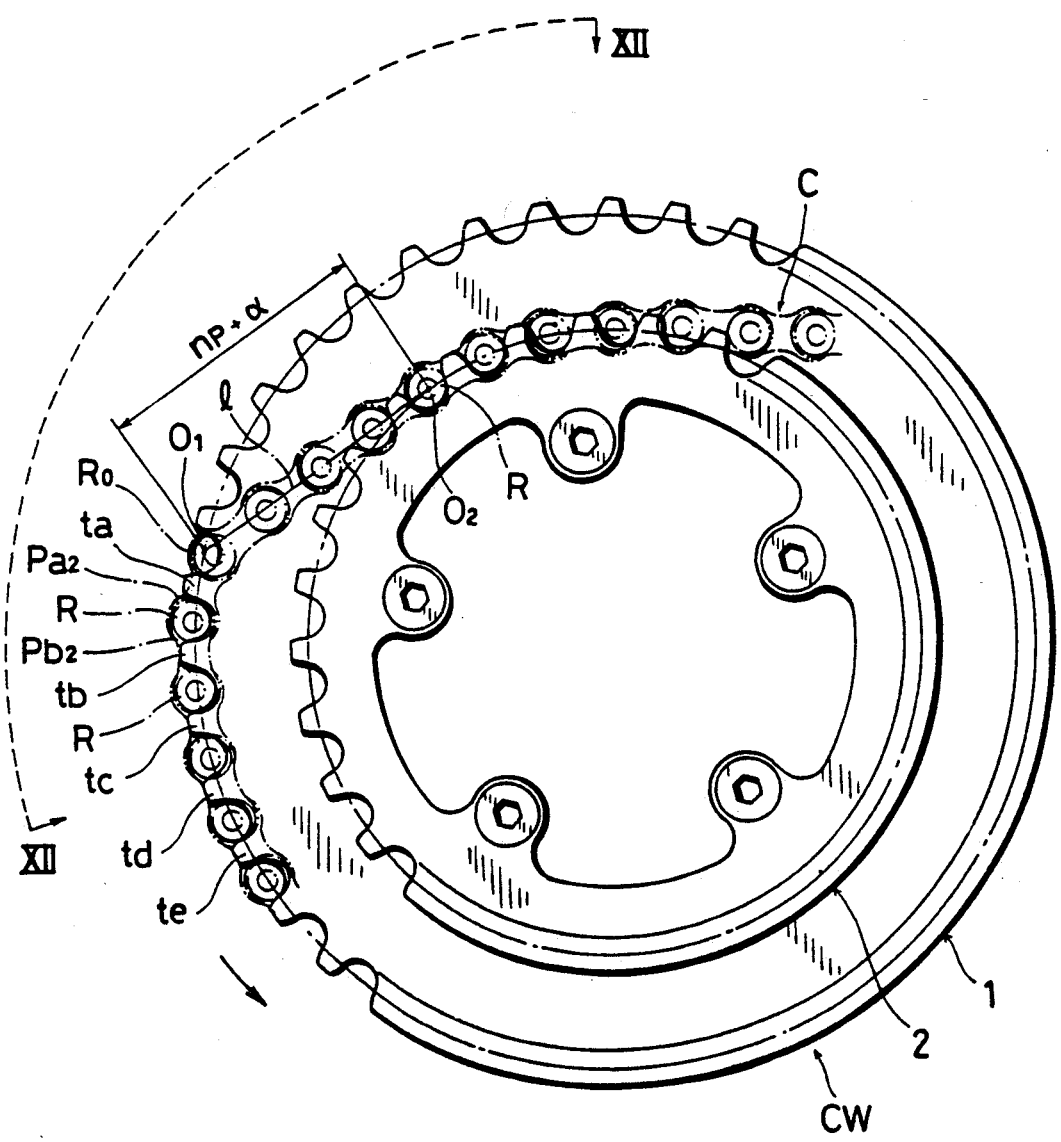

According to the present invention, the asymmetric teeth tx are provided in the angular regions containing the circumferential points A1, A2 of the larger sprocket. Each of the asymmetric teeth tx has a forwardly convex leading edge 9 (hatched in FIG. 1) which is effective in limiting too easy disengagement of the chain roller pin R. As opposed to the sprocket of FIG. 7 having circumferentially slenderized teeth, the larger sprocket of the present invention is capable of preventing the chain C from prematurely disengaging therefrom before completely shifting to the smaller sprocket 2. Further, the leading edge of each asymmetric tooth tx is smoothly convex, so that it will not excessively limit disengagement of the chain roller pin R.

Figure 12:
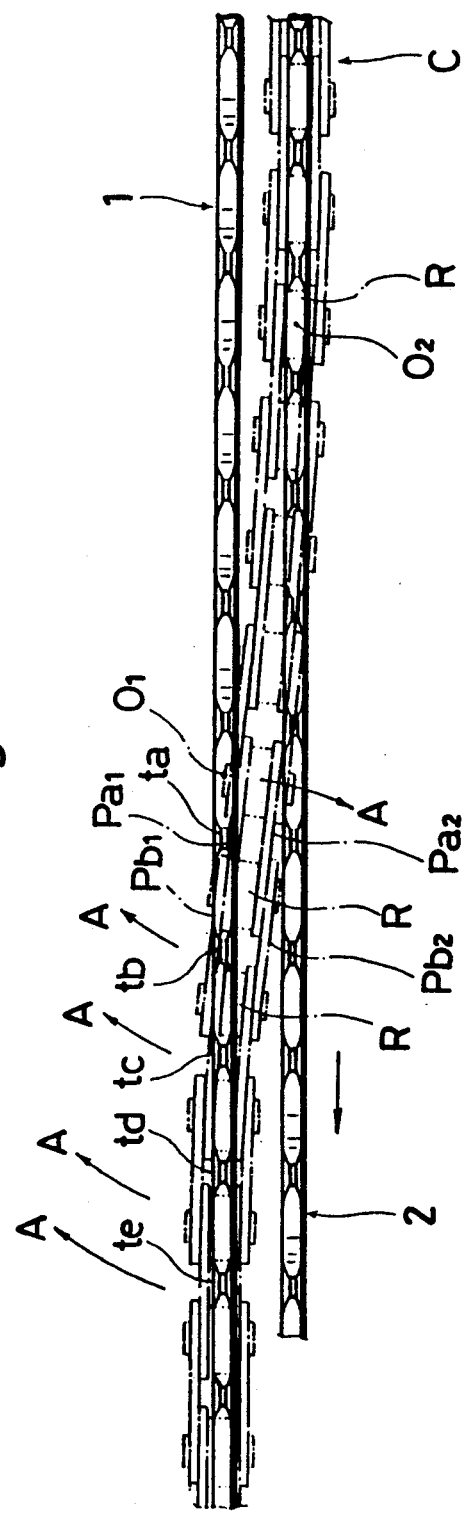
Figure 13:
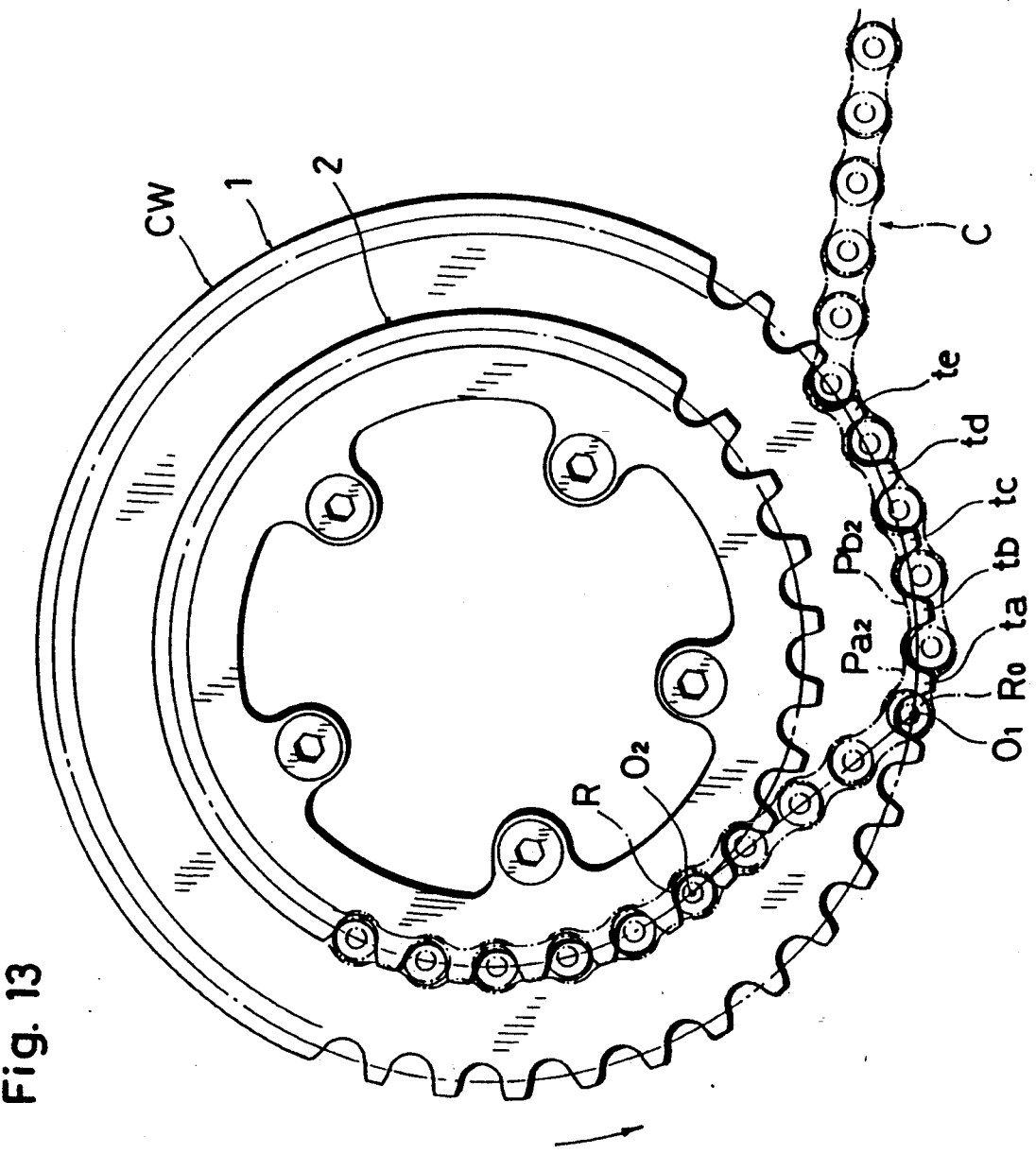

On the other hand, each of the asymmetric teeth tx has a trailing edge which is located relatively close to the corresponding pitch center C, so that a sufficient interval is provided between the asymmetric teeth tx. Thus, even if a disengaging chain link plate obliquely crossing the larger sprocket is forced radially inward (see FIG. 12), the link plate will not be firmly engaged with the relevant sprocket teeth nor subjected to a large bending force (indicated by the arrows A in FIG. 12). In this way, it is possible to effectively prevent the chain locking phenomenon which may cause the chain C to be firmly captured by the larger sprocket 1. Further, according to the illustrated embodiment, the bulge 9 of the leading edge is provided clear of the tooth root, so that a sufficient teeth interval is provided between the tooth roots. This configuration also contributes to the preventing of the chain locking phenomenon.

As described above, the chainwheel according to the present invention is capable of preventing the premature chain disengagement and the chain locking phenomenon in shifting the chain from the larger sprocket 1 to the smaller sprocket 2, thereby greatly improving the chain shiftability. Further, the tooth shape improvement, which is a simple solution, need be performed only in partial regions of the larger sprocket 1, so that substantial modifications can be avoided in carrying out the invention.

I claim:

1. A bicycle multiple chainwheel which is mounted on a pedal crank for transmitting a rider's pedalling force to a rear gear through a chain, the chainwheel comprising:

a diametrically larger sprocket mounted to said pedal crank and having an axis coinciding with the cranking axis of said pedal crank; and at least one diametrically smaller sprocket arranged laterally of but coaxially with said larger sprocket and mounted to said larger sprocket or said pedal crank; wherein said larger sprocket has circumferentially asymmetric teeth located in at least one of diametrically opposite angular regions which contain a diametrical line of said larger sprocket extending along crank arms of said pedal crank, each of said asymmetric teeth being offset relative to a corresponding pitch center in the forward rotational direction of the chainwheel in comparison with the other normal teeth of said larger sprocket.

2. The bicycle multiple chainwheel as defined in claim 1, wherein said asymmetric teeth are located in both of said angular regions.

3. The bicycle multiple chainwheel as defined in claim 1, wherein each of said angular regions of said larger sprocket covers an angle of 30° in each of the forward and rearward rotational directions of the chainwheel from another diametrical line which is displaced through an angle of 5°-15° in the forward rotational direction of the chainwheel from the first-mentioned diametrical line.

4. The bicycle multiple chainwheel as defined in claim 1, wherein each of said asymmetric teeth has a leading edge which is bulged in the forward rotational direction of the chainwheel in comparison with the other normal teeth of said larger sprocket.

5. The bicycle multiple chainwheel as defined in claim 1, wherein each of said asymmetric teeth has a leading edge, a portion of said leading edge extending from an intermediate height to the tooth tip being smoothly convex.

6. The bicycle multiple chainwheel as defined in claim 1, wherein each of said asymmetric teeth has a trailing edge whose spacing from the corresponding pitch center is smaller than the spacing between the trailing edges of the other normal teeth and their respective pitch centers.

7. The bicycle multiple chainwheel as defined in claim 1, wherein said larger sprocket has a tooth carrying ring portion and a plurality of stays extending radially inward from said tooth carrying portion.

8. The bicycle multiple chainwheel as defined in claim 7, wherein one of said crank arms of said pedal crank is integrally formed with a plurality of support arms extending radially outward from said cranking axis for connection to said stays of said larger sprocket.

9. The bicycle multiple chainwheel as defined in claim 8, wherein said stays of said sprocket are connected to said support arms of said one crank arm by bolting.

10. The bicycle multiple chainwheel as defined in claim 8, wherein said smaller sprocket is connected to said support arms of said crank arm.

* * * * *